United States Patent [19]

Larson

[11] Patent Number: 4,746,717

[45] Date of Patent: May 24, 1988

[54] ISOCYANATE-TERMINATED SULFOCOMPOUNDS

[75] Inventor: Wayne K. Larson, Maplewood, Minn.

[73] Assignee: Minnesota Mining and Manufacturing Company, St. Paul, Minn.

[21] Appl. No.: 9,616

[22] Filed: Jan. 22, 1987

Related U.S. Application Data

[63] Continuation of Ser. No. 739,542, May 30, 1985, abandoned, which is a continuation-in-part of Ser. No. 562,459, Dec. 16, 1983, Pat. No. 4,558,149.

[51] Int. Cl.$^4$ .............................................. C08G 18/32
[52] U.S. Cl. ........................................ 528/68; 528/71; 528/76; 558/232; 558/240
[58] Field of Search ................ 528/68, 71, 76, 83; 558/50, 232, 240

[56] References Cited

U.S. PATENT DOCUMENTS

| | | | |
|---|---|---|---|
| 2,845,402 | 7/1958 | Woodruff | 260/75 |
| 4,073,777 | 2/1978 | O'Neill et al. | 260/75 |
| 4,304,923 | 12/1981 | Rousseau | 560/26 |
| 4,307,219 | 12/1981 | Larson | 528/71 |
| 4,309,560 | 1/1982 | Aoki et al. | 560/14 |
| 4,321,404 | 3/1982 | Williams et al. | 560/115 |
| 4,503,198 | 3/1985 | Miyai | 525/440 |

*Primary Examiner*—Christopher Henderson
*Attorney, Agent, or Firm*—Donald M. Sell; James A. Smith; Lorraine R. Sherman

[57] ABSTRACT

An isocyanate-terminated sulfocompound is the reaction product of a polyisocyanate and a sulfopolyol or sulfopolyamine which is the reaction product of one mole of a sulfodicarboxylic acid and about two moles of an aliphatic polyol or polyamine having two or more hydroxyl or amino groups attached to a linear chain and having a molecular weight of up to 2000. The sulfocompound can be reacted with ethylenically-unsaturated alcohols, water, polyamines, or polyols, to give ethylenically-unsaturated sulfocompounds, sulfopolyureas or sulfopolyurethanes.

7 Claims, No Drawings

ISOCYANATE-TERMINATED SULFOCOMPOUNDS

CROSS-REFERENCE TO RELATED APPLICATION

This is a continuation of application Ser. No. 06/739,542 filed May 30, 1985, now abandoned, which is a continuation-in-part of application Ser. No. 06/562,459, filed Dec. 16,1983, now U.S. Pat. No. 4,558,149.

TECHNICAL FIELD

This invention relates to a water- and organic solvent-soluble compound which is an ethylenically-unsaturated derivative of a sulfopolyol or sulfopolyamine which on exposure to energy is converted to a water- and organic solvent-insoluble polymer. In another aspect, the invention relates to a substrate bearing a layer of water- and solvent-soluble sulfocompound. In a further aspect, the invention relates to a substrate bearing a layer of the polymer of the sulfocompound. In a still further aspect the invention relates to isocyanate-terminated sulfocompounds from which the ethylenically-unsaturated derivatives are prepared.

BACKGROUND ART

Water-soluble polyesters which are curable to insoluble resins on exposure to heat or radiation are known. U.S. Pat. No. 2,845,402 discloses polyesters that on heating in the presence of a catalyst cure to insoluble resins and that are the reaction products of polyalkyleneoxide polyols and dicarboxylic acids. U.S. Pat. No. 4,073,777 discloses polyesters and polyesteramides that crosslink to water-insoluble resins on exposure to radiation and that are the reaction products of (1) at least one dicarboxylic acid, (2) at least one glycol, (3) sufficient sulfoaromatic dicarboxylic acid, dihydroxy, or diamino compound to provide water dispersibility to the reaction product, and (4) an unsaturated mono or dicarboxylic acid.

The water-soluble polyesters described in the above cited patents, although convertible on exposure to actinic radiation to water-insoluble resins, are high molecular weight compounds that are prepared by high temperature reactions requiring the heating of unsaturated reactants to temperatures of about 270° C. for long periods of time. Such high molecular weight compounds have a high melt viscosity that adds to the difficulties encountered in handling the compounds. Also, because of the harsh and prolonged heating required in their preparation, the ethylenic unsaturation does not always survive.

SUMMARY OF THE INVENTION

The present invention provides a low molecular weight (i.e., generally less than 6500), film-forming, polymerizable, ethylenically-unsaturated sulfocompound that is hydrophilic and solvent-dispersible (i.e., soluble or dispersible in both water and organic solvents) but is readily converted on exposure to actinic radiation to a polymer that is solvent-insoluble (i.e., not soluble in water, organic solvents, or mixtures of water and organic solvents) and, in certain examples, is hydrophobic.

Briefly, the sulfocompound is the poly(ethylenically-unsaturated) ester, amide, urethane, or urea that comprises either (1) the reaction product of a polyether or polyester sulfopolyol or sulfopolyamine and an ethylenically-unsaturated compound selected from 2-alkenylazlactones and ethylenically-unsaturated isocyanates or (2) the reaction product of an isocyanate group terminated sulfopolyether or sulfopolyester and an ethylenically-unsaturated alcohol, the sulfopolyol or sulfopolyamine comprising the reaction product of one mole of a sulfodicarboxylic acid and two moles of an aliphatic polyether- or polyester-polyol or polyamine having a molecular weight of up to about 2000 and two to four hydroxyl or amino groups and the ethylenically-unsaturated sulfocompound having an ethylenic unsaturated functionality of 2 to 18 and an equivalent weight per ethylenic unsaturated functionality of less than 2500.

DETAILED DESCRIPTION OF THE INVENTION

Preferably, the ethylenically-unsaturated sulfocompound of the invention comprises the reaction product of:

1. a sulfopolyol or a sulfopolyamine which is the reaction product of
   (a) one mole of a sulfodicarboxylic acid and
   (b) about two moles (i.e., 1.95 to 2.05 moles) of one or more aliphatic polyether- or polyester polyols or polyamines (i.e., a compound in which the structure to which two or more hydroxyl or amine groups are attached is a saturated linear chain of up to about 110 carbon atoms in units of 2 to 12 —$CH_2$— groups which can be separated by individual oxygen atoms and

groups), the polyol and polyamine having a molecular weight of up to about 2000 and (c+1) hydroxyl or amino groups (in which c is an integer of 1, 2, or 3); and 2. 2 c moles of either (a), (b), or (c), in which
   (a) is a compound selected from
      (i) 2-alkenylazlactones having the formula

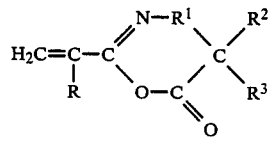

wherein
R is hydrogen or methyl;
$R^1$ is a covalent bond, —$CH_2$— or —$CH_2CH_2$—,
$R^2$ and $R^3$ are independently hydrogen or methyl; and (ii) ethylenically-unsaturated isocyanates having the formula

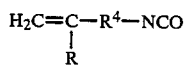

wherein
$R^4$ is a covalent bond,

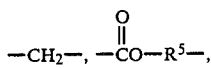,

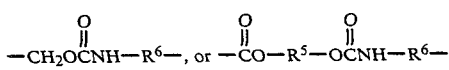

wherein
R[5] is a linear or branched chain of 1 to 12 carbon atoms optionally containing one nonperoxidic catenary oxygen atom or

group or R[5] is a 5- or 6-membered carbocyclic group optionally substituted by lower alkyl groups having 1 to 4 carbon atoms, the carbocyclic group having a total of up to 12 carbon atoms, and R[6] is an organic group selected from linear or branched alkylene groups having 2 to 12 carbon atoms, a cyclopentamethylene group, a cyclohexamethylene group, a 5- or 6-membered azacyclic group, a phenylene group, a naphthalene group, a phenylenemethylene phenylene group, the organic group optionally substituted by up to four lower alkyl groups having 1 to 4 carbon atoms and a total of up to 15 carbon atoms; or (b) one or more polyisocyanates or their dimerization and their trimerization products having the formula $$OCN-R^{12}(-NCO)_d \qquad III$$

wherein R[12] is an organic group having a valence of d+1 selected from linear and branched groups having 2 to 12 carbon atoms, 5- and 6-membered carbocyclic groups having 5 to 14 carbon atoms, and d is a number having a value of 1 to 3, the reaction product of the sulfopolyol or polyamine and the polyisocyanate comprising an isocyanate-terminated sulfocompound having the formula:

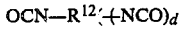

wherein
R[9] is an arenetriyl group (trivalent arene group) having 6 to 20 carbon atoms or an alkanetriyl (trivalent alkane) group having 2 to 20 carbon atoms remaining after the removal of carboxyl and sulfo groups from sulfoarene- and sulfoalkane dicarboxylic acids having the formula

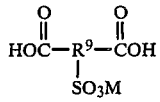

in which M is a cation, and preferably M is Na, but M can be H, an alkali metal ion such as K or Li, an alkaline earth metal cation (e.g., Mg, Ca, or Ba), or a primary, secondary, tertiary, or quaternary ammonium cation such as ammonium, methylammonium, butylammonium, diethylammonium, triethylammonium, tetraethylammonium, and benzyltrimethylammonium cation;

R[10] is a linear aliphatic group having a valence of (c+1) that is the residue of a polyether or polyester polyol or polyamine having the formula $$HXR^{10}(XH)_c \qquad X$$

the aliphatic group consisting of a saturated chain of up to about 110 carbon atoms in units of 2 to 12 —CH$_2$— groups which can be separated by individual oxygen atoms and

groups, the aliphatic group having a molecular weight of up to about 2000, wherein c is an integer of 1, 2, 3;
each X is independently —O— or —NH—; and
R[12] and d are as defined above for Formula III; the isocyanate-terminated sulfocompound then being reacted with 2 c·d moles of an ethylenically-unsaturated alcohol having the formula

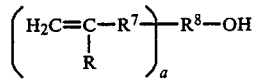

wherein
R is as defined above for Formula I;
R[7] is a

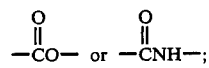

R[8] is a polyvalent aliphatic group selected from linear and branched alkyl groups having a valence of (a+1), 2 to 12 carbon atoms, that can be interrupted by one nonperoxidic catenary oxygen atom, and/or one

group, and alicyclic groups having a 5- or 6-atom carbocyclic structure optionally substituted by up to 4 lower alkyl groups having 1 to 4 carbon atoms and a total of up to 12 carbon atoms, and preferably the polyvalent group is selected from

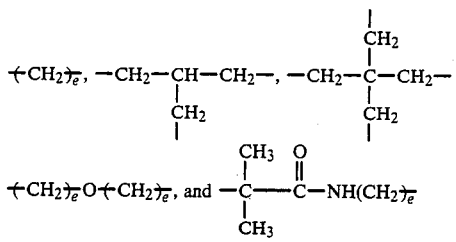

in which e is an integer of 1 to 6 inclusively; and a is an integer of 1, 2, or 3; or (c) the reaction product of one mole of organic polyisocyanate of Formula III and d moles of an ethylenically-unsaturated alcohol of Formula IV; there being essentially no (i.e., less than 0.5 weight percent) hydroxyl, amino, or isocyanate groups remaining after the reaction of 1.0 with either 2(a), 2(b), or 2(c).

In step 2b, an excess of polyisocyanate of Formula III can be used in the reaction with the sulfopolyol or sulfopolyamine in an amount up to about 100% excess (e.g., up to about four moles of polyisocyanate per mole of sulfopolyol or sulfopolyamine). When such an excess is used the isocyanate-terminated sulfocompound of Formula IX mixed with excess polyisocyanate is obtained. This mixture can then be used to provide the ethylenically-unsaturated sulfocompound by reaction with one mole of ethylenically-unsaturated alcohol of Formula IV per equivalent of isocyanate present in the reaction mixture of the isocyanate-terminated sulfocompound. A mixture of the ethylenically-unsaturated sulfocompound and non-sulfocompound containing ethylenically-unsaturated compounds is obtained.

The various chemical reactions that provide the sulfocomounds of the invention and their derivatives are shown in the FLOW CHART below.

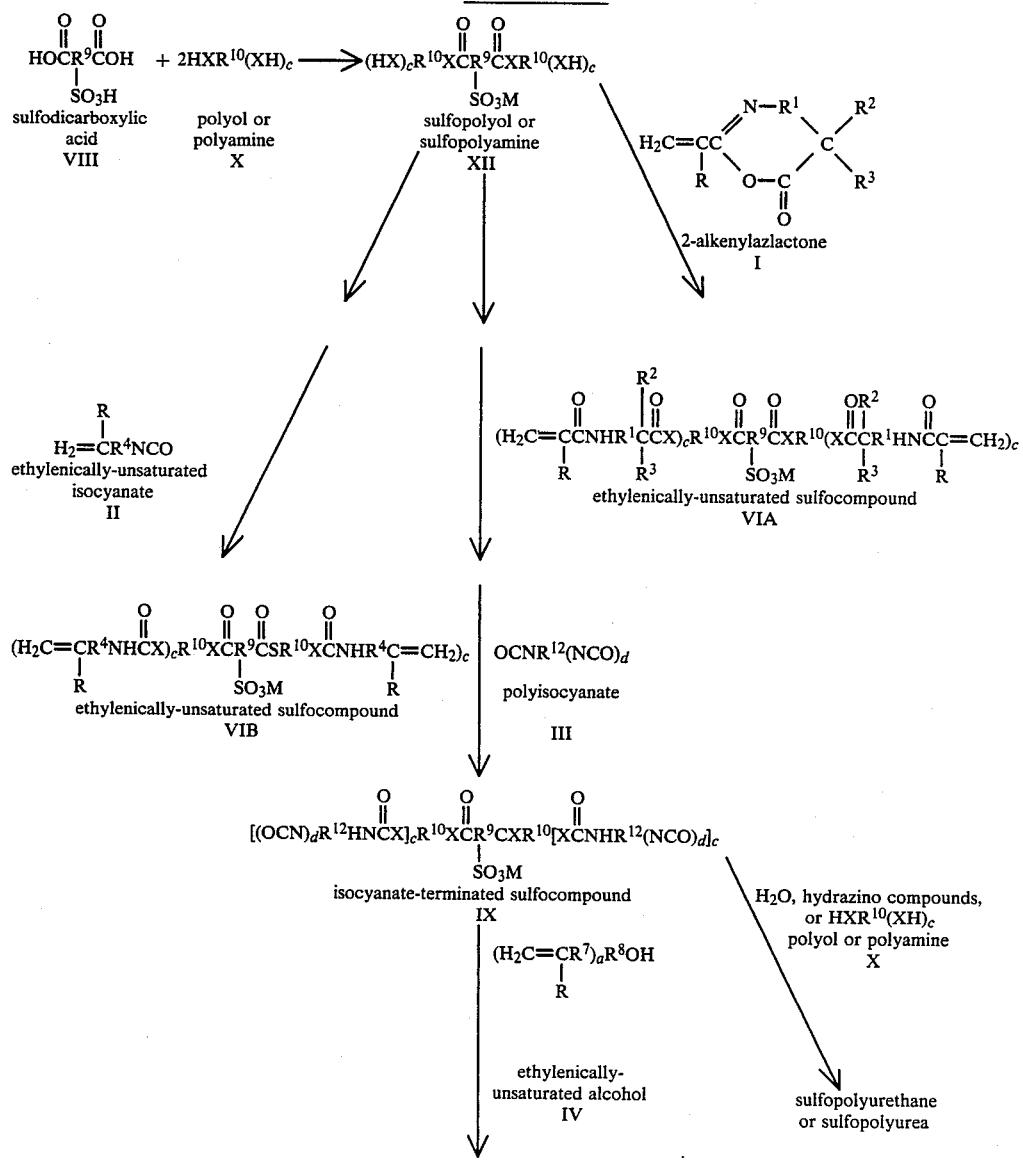

-continued
FLOW CHART

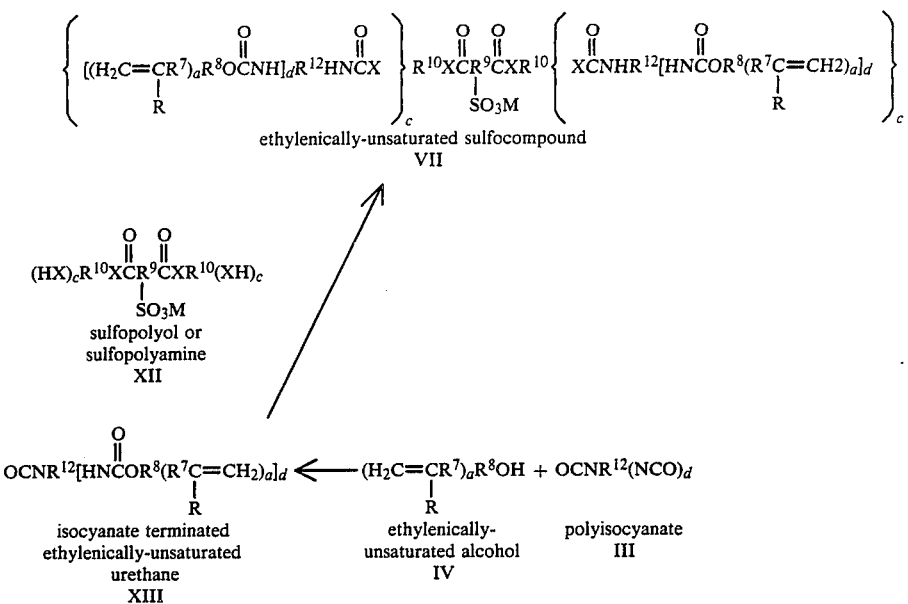

Preferably, the low molecular weight, film-forming, polymerizable, ethylenically-unsaturated sulfocompound has an equivalent weight per ethylenic unsaturated functionality of about 300 to 1000. As the unsaturated functionality is increased above about 600, the polymer becomes increasingly hydrophilic and as the functionality is decreased below about 600, the polymer becomes increasingly hydrophobic.

There is also provided by the invention energy-curable coating compositions comprising the hydrophilic, water- and organic solvent-dispersible, polymerizable, ethylenically-unsaturated sulfocompound in a solvent (preferably water), and optionally a free radical source. Furthermore, there are provided substrates bearing a layer comprising the preferable hydrophilic, water- and organic solvent-soluble polymerizable ethylenically-unsaturated sulfocompound of a sulfopolyester polyol or polyamine and, also, substrates bearing a layer of the polymerized ethylenically-unsaturated sulfocompound of a sulfopolyester polyol or polyamine.

As used in this application:

"poly(ethylenically-unsaturated ester or amide)" means an organic compound having an ethylenically-unsaturated group (i.e., $H_2C=CH-$ or $H_2C=C(CH_3)-$) that is connected to the compound by means of at least one of a bond, a methylene group, a carboxylate (i.e.,

), an amide (i.e.,

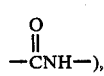), or a carbamate group (also called urethane group, i.e.,

);

"low molecular weight ester" means a compound that is the ethylenically-unsaturated derivative of a sulfoester that is the reaction product of one mole of a sulfodicarboxylic acid and no more than two moles of polyol or polyamine having 2 to 4 hydroxyl or amino groups followed by reaction with 2 to 6 moles of an ethylenically-unsaturated compound. The compound therefore, has only one sulfo group and generally has a molecular weight of less than 6500, and preferably less than 4000;

"lower alkyl" means 1 to 4 carbon atoms;

"catenary" means in the main chain or backbone and not in a pendent or terminal group;

"sulfo" means a $-SO_3H$ group or a salt thereof;

"sulfocompound" means a water- and organic solvent-soluble compound which is an ethylenically-unsaturated derivative (i.e., an ester or an amide) of a sulfopolyol or sulfopolyamine;

"sulfopolyesterpolyurethane" or "sulfopolyoxyalkylenepolyurethane" or "sulfopolyurethane" means the reaction product of the isocyanate-terminated sulfocompound of Formula IX with a polyalcohol of Formula XI to provide

groups; and

"sulfopolyesterpolyurea" or "sulfopolyoxyalkylenepolyurea" or "sulfopolyurea" means the reaction product of the isocyanate-terminated sulfocompound of Formula IX with water or a primary or secondary polyamine to provide

groups.

The water- and organic solvent-dispersible, low molecular weight, film-forming, polymerizable, ethylenically-unsaturated sulfocompounds of the invention preferably have the general formulas

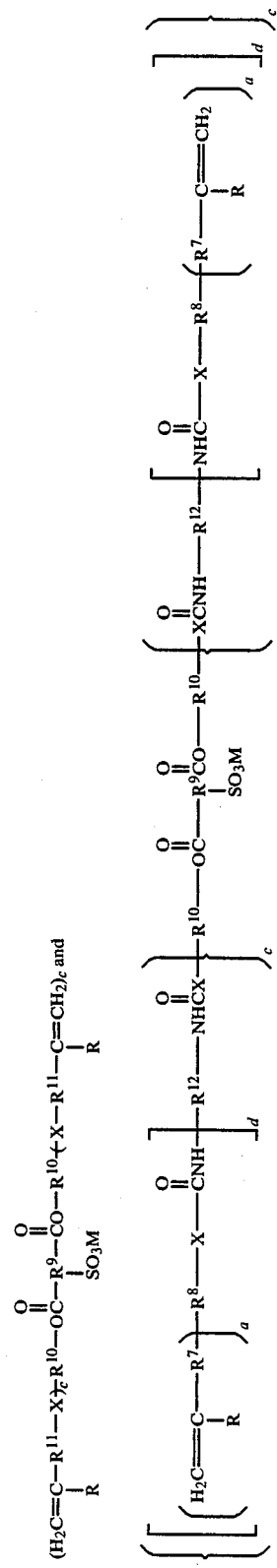

wherein:

R, $R^7$, $R^8$, $R^9$, $R^{10}$, $R^{12}$, X, M, a, c, and d are defined above, and $R^{11}$ is

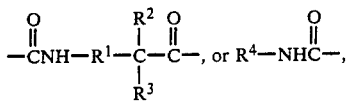

in which $R^1$, $R^2$, $R^3$, and $R^4$ are as defined above.

The coating compositions of the invention are energy-curable and preferably comprise the low molecular weight, solvent-soluble, film-forming, polymerizable urethane group-containing compounds of Formulas VI and VII and a free radical generating compound that generates free radicals on application of energy.

The low molecular weight, water- and organic solvent-dispersible, film-forming, polymerizable sulfocompound of the invention can be prepared by procedures well known in the art, preferably by the reaction of one mole of sulfoarene or sulfoalkane dicarboxylic acid, Formula VIII, (or their esters prepared from an alcohol of low molecular weight, i.e. below about 94, their acid anhydrides, or their acid halides) with two moles of aliphatic monomeric or polymeric polyol having (c+1) hydroxyl or amino groups forming a sulfopolyol or sulfopolyamine having 2 c hydroxyl or amino groups, whether c is an integer of 1, 2, or 3. The sulfopolyol or sulfopolyamine is then caused to react with either: (a) (i) 2 c moles of an ethenylazlactone, or (ii) with 2 c moles of an ethylenically-unsaturated isocyanate, preferably an isocyanatoalkyl acrylate or polyacrylate, (b) 2 c moles of an organic polyisocyanate to form an isocyanate-terminated sulfopolyol or sulfopolyamine that is followed by reaction with 2 c moles of an ethylenically-unsaturated alcohol, preferably a hydroxyalkyl acrylate, or (c) 2 c moles of the reaction product of one mole of organic polyisocyanate with d moles of an ethylenically-unsaturated alcohol, preferably a hydroxyalkyl acrylate. As is known in the art, these reactions can be performed in the presence of a mercury, lead or tin catalyst such as dibutyltin dilaurate. Preferably, the catalyst is a tertiary amine, tricalcium aluminate, or the potassium salt of a molybdenum ester of triethyleneglycol as is disclosed in U.S. Pat. No. 2,916,464. The preparation of the sulfopolyol or sulfopolyamine can be carried out by heating the reactants for about 2 to 20 hours, preferably 4 to 10 hours, at temperatures from 150° to 300° C., preferably 200° to 250° C., under reduced pressure or an inert atmosphere. Reactions in which one of the components is an acrylic group-containing compound need be heated at a temperature of only about 20° to 100° C., preferably 30° to 60° C. for 1 to 10 hours.

Aliphatic polyols, $(HO)_cR^{10}$—OH, useful in preparing the water- and organic solvent-dispersible sulfocompounds of the invention have a molecular weight of 62 to 1000 and include, for example, monomeric and polymeric polyols having two to four hydroxyl groups. Examples of the monomeric polyols include ethylene glycol, propylene glycol, butylene glycol, hexamethylene glycol, 1,1,1-trimethylolpropane, pentaerythritol, and the like. Examples of polymeric polyols include the polyoxyalkylene polyols, i.e., the diols, triols, and tetrols, the polyester diols, triols, and tetrols of organic dicarboxylic acids and polyhydric alcohols, and the polylactone diols, triols, and tetrols having a molecular weight of 106 to about 2000. Examples of polymeric polyols include polyoxyethylene diols, triols and tetrols such as the Carbowax TM polyols available from Union Carbide, the polyoxytetramethylenediols such as Polymeg TM polyols available from Quaker Oats Company, the polyester polyols such as the Multron TM poly(ethyleneadipate)polyols available from Mobay Chemical Company, and the polycaprolactone polyols such as the PCP TM polyols available from Union Carbide.

Aliphatic polyamines, $(H_2N)_cR^{10}$—$NH_2$, useful in preparing the sulfocompounds of the invention are the polyamines available from Jefferson Chemical Co., Inc., a subsidiary of Texaco, Inc., under the tradename Jeffamine TM such as Jeffamine TM D-400, a polyoxypropylene diamine having a molecular weight of about 400; Jeffamine TM D-230, a polyoxypropylene diamine having a molecular weight of about 230; Jeffamine TM T-403, a polyoxypropylene triamine having a molecular weight of about 400; and Jeffamine TM ED 600 and ED 900, which are polyoxyethylene diamines having molecular weights of 600 and 900, respectively. In addition, hydrazino compounds such as adipic dihydrazide or ethylene dihydrazine can be used.

Sulfoarene- and sulfoalkanedicarboxylic acids of Formula VIII useful for preparation of the water- and solvent-dispersible sulfocompounds of the invention are any of the known sulfoarene- and sulfoalkanedicarboxylic acids. Examples of these include sulfoalkanedicarboxylic acids such as sulfosuccinic acid, 2-sulfoglutaric acid, 3-sulfoglutaric acid and 2-sulfododecanedioic acid; sulfoarenedicarboxylic acids such as 5-sulfoisophthalic acid, 2-sulfoterephthalic acid, 5-sulfonaphthalene-1,4-dicarboxylic acid; sulfobenzylmalonic acids such as those described in U.S. Pat. No. 3,821,281; and sulfofluorene-dicarboxylic acids such as 9,9-di(2'-carboxyethyl)fluorene-2-sulfonic acid described in British Patent No. 1,006,579. It is to be understood that the corresponding lower alkyl esters, halides, anhydrides, and salts of the above sulfonic acids can also be used in the preparation.

2-Alkenylazlactones, compounds of Formula I, which can be caused to react with sulfopolyols and sulfopolyamines to form the ethenically-unsaturated compounds of the invention are ethylenically-unsaturated compounds having a reactivity similar to the isocyanates for reaction with a nucleophilic group. Examples of 2-alkenylazlactones include 2-ethenyl-1,3-oxazolin-5-one, 2-isopropenyl-1,3-oxazolin-5-one, 2-ethenyl-4,4-dimethyl-1,3-oxazolin-5-one, 2-isopropenyl-4,4-dimethyl-1,3-oxazolin-5-one, 2-ethenyl-5,6-dihydro-5,5-dimethyl-4H-1,3-oxazin-6-one, and 2-isopropenyl-5,6-dihydro-5,5-dimethyl-4H-1,3-oxazin-6-one. The reaction with the sulfopolyol is performed at 0° C. to 50° C. under atmospheric pressure in the presence of about 0.1 to 5 percent by weight of a Lewis acid such as $BF_3$-etherate, $AlCl_3$, or $SnCl_4$, as catalyst. The reaction with the sulfopolyamine is relatively rapid and is accompanied by a mild exotherm and generally does not require a catalyst. Other 2-alkenylazlactones and conditions that can be used are described in assignee's copending patent application Ser. No. 316,234, filed Oct. 29, 1981, which is incorporated herein by reference.

Ethylenically-unsaturated isocyanates of Formula II useful in reacting with the sulfopolyols or sulfopolyamines for preparing the ethylenically-unsaturated sulfocompounds of the invention include 2-isocyanatoethyl acrylate and methacrylate, 3-isocyanatopropyl acrylate and methacrylate, 2-acrylamidoethylisocyanate, 3-acrylamidopropylisocyanate, 3-methacrylamidopropylisocyanate, 2,3-bis(acryloyloxy)-propylisocyanate 3,3,3-tris(acryloyloxymethyl)-propylisocyanate, 4-methacryloyloxycyclohexylisocyanate, 5-acryloyloxymethyl-3,3,5-trimethylcyclohexylisocyanate, allylisocyanate, methallylisocyanate, and the reaction product of the hydroxyalkyl acrylates and polyisocyanates given below.

Polyisocyanates, Formula III, that can be used to react with the sulfopolyols or sulfopolyamines to form the isocyanate-terminated sulfopolyesters that are intermediates to the ethylenically-unsaturated sulfocompounds of the invention are any of the well-known polyisocyanates. Preferred polyisocyanates are hexamethylene diisocyanate, toluene diisocyanate, isophorone diisocyanate, 3,5,5-trimethyl-1-isocyanato-3-isocyanatomethylcyclohexane, 4,4'-diphenylmethane diisocyanate (MDI), 4,4', 4''-triisocyanatotriphenylmethane, and the polymethylenepolyphenylisocyanates. Other polyisocyanates are well known and include those described in U.S. Pat. Nos. 3,700,643 and 3,600,359 among many others. Mixtures of polyisocyanates can also be used such as the mixture of MDI and trimer of MDI available from Upjohn Polymer Chemicals as Isonate® 143L "Liquid MDI".

Ethylenically-unsaturated alcohols of Formula IV that can be used to react with the isocyanate-terminated sulfopolyester in preparing the ethylenically-unsaturated sulfocompounds of the invention are allyl and methallyl alcohols, 2-hydroxyethyl acrylate and methacrylate, 3-hydroxypropyl acrylate and methacrylate, 1,1,1-trimethylolpropane diacrylate, and dimethacrylate pentaerythritol triacrylate and trimethacrylate. These compounds are well known and described in many patents, such as for example, U.S. Pat. No. 4,108,840, col. 8, lines 24-51. Especially preferred of these compounds are 2-hydroxyethyl acrylate and 3-hydroxypropyl acrylate. Other preferred hydroxyalkyl acrylates are 2,2,2-tris(acryloyloxymethyl)ethanol and 2,3-di(acryloyloxy)propanol.

The ethylenically-unsaturated sulfocompounds of the invention can also be prepared by first reacting d moles of ethylenically-unsaturated alcohols of Formula IV, described above, with one mole of the polyisocyanates of Formula III, also described above, and reacting this ethylenically-unsaturated isocyanate with the aliphatic polyol, $(HO)_cR^{10}$—OH, or aliphatic polyamine, $(H_2N)_cR^{10}$—$NH_2$.

The coating composition of the invention may be prepared by dissolving the polymerizable ethylenically-unsaturated sulfocompound in a suitable solvent. Water, aqueous-organic solvent, or an organic solvent can be used. Generally, from 0.05 to 20 parts, preferably 0.2 to 4 parts, of solvent, preferably water, are used per part ethylenically-unsaturated sulfocompound. Examples of solvents that can be used include acetone, methyl ethyl ketone, methanol, aqueous methanol, aqueous ethanol, trichloroethylene, toluene, and the like. Other preferred solvents are the reactive solvents that are ethylenically-unsaturated and are copolymerizable with the ethylenically-unsaturated sulfocompound of the invention. Particularly preferred reactive solvents are the acrylic and methacrylic acid esters such as, for example, ethyl acrylate, butyl acrylate, n-octyl acrylate, allyl acrylate, cyclohexyl acrylate, N-methylcarbamoyloxyethyl acrylate, neopentylglycol diacrylate, 1,6-hexanediol diacrylate, pentaerythritol tetraacrylate, 1,3,5-tri(2-acryloyloxyethyl)isocyanurate, and the corresponding methacrylates.

Depending on the particular application of the coating composition it may be desirable to include in the composition conventional antioxidants, thermal stabilizers or free radical inhibitors in order to prolong storage life of the composition. Examples of such materials are butylated hydroxyanisole (BHA) and butylated hydroxytoluene (BHT) commercially available as Ionox ™ 220 (Shell), Santonox ™ R (Monsanto), Irganox ™ 1010 (Ciba-Geigy), etc. Generally, from 0.01 to 5.0 percent by weight of the total weight of the coating composition can be used.

The properties of the coatings can be further modified by including in the coating composition a variety of adjuvants utilized for their known purpose, such as lubricants, plasticizers (e.g., dibutyl phthalate), tackifying resins (e.g., the copolymer of styrene and alpha-methylstyrene), inorganic thickeners, fillers (e.g., organic and inorganic particles, fibers, and flakes), pigments, and dyes. Fillers can generally be used in proportions up to about 200 parts by weight per 100 parts by weight of copolymerizable components of the coating composition. When insoluble components are desired in the coating composition, it may be necessary to use conventional high speed dispersing apparatus such as paint mills, ball mills, and the like.

Free radical generating compounds that can be used in the coating composition of the invention for effecting the conversion, on exposure to energy, of coatings prepared from the composition having ethylenically-unsaturated terminal groups, from a solvent-soluble, hydrophilic state to a solvent-insoluble, hydrophobic state, are materials known in the art. Particularly suitable free radical generating compounds include, for example, organic peroxides, azo compounds, aromatic diazonium salts, aromatic iodonium salts, aromatic sulfonium salts, aromatic phosphonium salts, quinones, benzophenones, nitroso compounds, acyl halides, aryl halides, hydrazones, mercapto compounds, pyrrylium compounds, triarylimidazoles, biimidazoles, and chloroalkyltriazines, These materials, in general, must have photosensitizers therewith to form a photoinitiator system useful with radiation above about 400 nm. Photosensitizers, such as spectrally absorbing dyes, are well known in the art. Generally, the free radical generating compound is used at a concentration of 0.01 to 10 percent, preferably 0.05 to 5 percent, by weight of the total weight of the coating composition and the photosensitizer is used at a concentration of 10 percent to 100 percent by weight of the weight of the free radical generating compound.

Additional reference in the art to free radical photoinitiator systems for ethylenically-unsaturated compounds are included in U.S. Pat. No. 3,887,450 (e.g., col. 4), U.S. Pat. No. 3,895,949 (e.g., col. 7), and U.S. Pat. No. 4,043,819. Preferred initiators are the onium salts as disclosed in U.S. Pat. Nos. 3,729,313; 4,058,400 and 4,058,401. Other desirable initiators are biimidazoles (disclosed in U.S. Pat. No. 4,090,877) and chloroalkyltriazines as disclosed in U.S. Pat. No. 3,775,113. These references also disclose sensitizers therein. Another good reference to photoinitiator systems is *Light-Sensitive Systems*, J. Kosar, J. Wiley and Sons, Inc. (1965), especially Chapter 5.

The energy-curable compositions can be used to form crosslinked, adherent, abrasion-resistant coatings on substrates using substantially any technique known in the art including spraying, curtain coating, direct or reverse roll coating, dipping, brushing, extruding, and printing. However applied, the coating is allowed to dry to remove non-copolymerizable solvent, where used, and leave a hard tack-free coating that in the absence of applied energy, particularly actinic, remains soluble and can be removed from the substrate by treatment with a solvent, particularly water or an aqueous solvent such as aqueous methanol. The dried coating can be crosslinked by exposure to radiation for a sufficient time and intensity which may vary from about ten seconds to ten minutes or more depending on the thickness and particular composition of the coating.

Substrates which may be coated with the crosslinkable compositions of the invention include organic substrates of wood, fiberboard, particle board, paper, and cardboard; synthetic and natural polymers such as polyesters, polyamides, cured phenolics, urea-aldehyde resins, poly(vinyl halides), polyacrylates, polyurethanes, proteins, rubber; inorganic substrates such as iron, stainless steel, copper, brass, bronze, aluminum, titanium, nickel, zinc, and alloys. Particularly useful substrates are silicated aluminum and the polyesters such as polyethyleneterephthalate and poly(vinyl chloride).

The energy-curable coatings of the invention can have a thickness ranging from about 0.01 m to about 10.0 mm or more, preferably 0.1 to 1.0 mm.

Suitable radiation for use in the crosslinking the coatings of the invention and rendering them insoluble include radiation at wavelengths in the 200 to 600 nm range, preferably 200 to 450 nm. Suitable sources include sunlight, carbon arcs, mercury-vapor arcs, black light lamps, fluorescent lamps, argon and xenon glow lamps, electronic flash units, and photographic flood lamps. Electron accelerators and electron beam sources may also be used.

The energy-curable coating compositions of the invention, particularly when coated onto a substrate, are suitable for use in the graphic arts for the recording of information, e.g., color separation images, in printing plates and for use in the production of resist images, e.g., printed circuits.

In addition to their use in the preparation of the ethylenically-unsaturated sulfocompounds of the invention by reaction with ethylenically-unsaturated alcohols, the isocyanate-terminated sulfocompounds and their mixture with excess polyisocyanates are useful for the preparation of other sulfo group-containing polymers that are hydrophilic but insoluble in water. By reaction of the isocyanate-terminated sulfocompounds with water, sulfopolyoxyalkylenepolyureas and sulfopolyesterpolyureas are prepared that are useful as hydrophilic coatings and self-supporting films. By reaction with polyols, the isocyanate-terminated sulfocompounds form sulfopolyoxyalkylene-polyurethanes and sulfopolyester-polyurethanes that are also useful for preparation of hydrophilic coatings and self-supporting films. Polyols that can be used for the preparation of the hydrophilic polyurethanes are any of the polyols known to be useful for the preparation of polyurethanes. Preferred polyols are the aliphatic polyols, $(HO)_cR^{10}OH$ disclosed above for the preparation of the sulfocompounds of the invention.

The isocyanate-terminated sulfocompound of Formula IX containing excess polyisocyanate can be further reacted with (1) the ethylenically-unsaturated alcohol of Formula IV, or (2) the polyol or polyamine of Formula X, or water, or hydrazino compounds such as adipic dihydrazide or 1,2-ethylene dihydrazine to provide, respectively, (1) a mixture of the ethylenically-unsaturated sulfocompound of Formula VII and an ethylenically-unsaturated compound not containing a sulfo group, and (2) a mixture of a sulfopolyurethane and a polyurethane not containing a sulfo group or a sulfopolyurea and a polyurea not containing a sulfo group. By varying the amount of excess isocyanate present in the composition the physical characteristics of the resulting material can be controlled, e.g., hydrophilicity, tensile strength, hardness, etc.

Objects and advantages of this invention are further illustrated by the following examples, but the particular materials and amounts thereof recited in these examples, as well as other conditions and details, should not be construed to unduly limit this invention.

EXAMPLE 1

Illustrating the Preparation of a Sulfopolyester Urethane Acrylate

Into a one liter 3-neck flask equipped with a mechanical stirrer, reflux condenser and drying tube, thermometer, and oil bath with temperature control, 130 g (0.1 mole) Sulfoester Polyol A (prepared as described below), was added to 50 g (0.2 mole) bis(4-isocyanatophenyl)methane, 0.03 g dibutyltin dilaurate, and 150 g methyl ethyl ketone. As stirring was initiated, the temperature began to rise. Additional heat was applied to raise the temperature of the contents of the flask to 60° C. and held at this temperature until analysis indicated the disappearance of hydroxyl and formation of isocyanate-terminated sulfopolyester (4 hours). There was then added 65 g pentaerythritol triacrylate and 500 ppm (with respect to the acrylate) of p-methoxy phenol. Stirring and heating was continued for an additional 4 hours at 60° C. The polymer was readily soluble in water from which it could be coated as a film and dried to a non-tacky coating that could be redissolved in water, sodium hydroxide solution, methanol, aqueous methanol, acetone, methylene chloride and other common organic solvents. The dried film had a calculated average molecular weight of 2400 and an acrylic group equivalent weight of about 400.

A cleaned copper sheet was coated with a solution of 20 g of the above-described carbamate acrylate of Sulfoester Polyol A (designated Carbamate Acrylate I) and 0.2 g of benzoin ethyl ether in 80 ml of 20 percent methyl ethyl ketone in water and dried in the air to provide a coating 5 micrometers thick. The film was exposed through a mask to ultraviolet from a 20 watt black light lamp for 2 minutes. The unexposed areas were readily removed by washing with water, methanol or other common solvent. The presence of Urethane Acrylate I in exposed areas is readily detected by wiping the washed, exposed sheet with a dilute solution of a cationic dye wherein the exposed areas take on the color of the dye. Utility of the urethane acrylates of the invention as a resist material is illustrated by the fact that the copper sheet bearing the water developed image is undamaged by immersion into a Woods metal bath (this is a well known low temperature melting alloy of bismuth and a mixture of other metals) at 260° C. for at least 30 seconds, is undamaged by a refluxing bath of HCl containing methanol, and will withstand a 30 percent ferric chloride copper etching bath without undercutting.

Preparation of Sulfoester Polyol A

A one liter 3-neck flask was equipped with a mechanical stirrer, a nitrogen purge, and set for vacuum distillation using a round-bottom flask which is cooled with a dry ice/acetone both for receiving distillate. A Woods metal bath was used to heat the 3-neck flask. Into the 3-neck flask was placed 148 g (0.5 mole) dimethyl 5-sulfoisophthalate, 530 g PCP-0200 (1.0 mole of polycaprolactonediol having a weight average molecular weight of 530 available from Union Carbide Corp.), 0.13 g tetraisopropyl titanate (0.02 percent by weight) as esterification catalyst. Nitrogen purge and agitation were initiated. The contents of the flask were brought to 230° C. and held for 4 hours during which time 50 to 75 percent of methanol condensate was removed. The pressure was reduced to 20 Torr and the temperature increased to 250° C. and held for two hours. The system was then back filled with nitrogen and the low viscosity product removed from the flask while hot. It was found to have a hydroxyl equivalent weight of 650.

EXAMPLES 2-9

Ethenically-unsaturated carbamate esters of sulfoester polyols were prepared by the procedure employed in EXAMPLE 1 using equivalent amounts of polyol and corresponding amounts of isocyanatoalkyl acrylates. The particular polyol and isocyanatoalkyl acrylate used to make the isocyanatoalkyl acrylate are given in TABLE I. Also given in TABLE I are the acrylic functionality and calculated acrylic equivalent weight of each urethane acrylate.

TABLE I

| Ex. no. | Carbamate acrylate | Acrylic functionality | Acrylic equivalent weight | Polyol[a] | Isocyanatoalkyl acrylate |
|---|---|---|---|---|---|
| 2 | II | 6 | 295 | PCP TM 0210[b] | TDI[c]/pentaerythritol triacrylate |
| 3 | III | 6 | 260 | Carbowax TM 600[d] | TDI/pentaerythritol triacrylate |
| 4 | IV | 2 | 655 | Polymeg TM 1000[e] | 2-isocyanatoethyl methacrylate |
| 5 | V | 2 | 230 | trimethylene glycol | 2-isocyanatoethyl methacrylate |
| 6 | VI | 12 | 290 | PCP TM 0300[f] | MDI[g]/pentaerythritol triacrylate |
| 7 | VII | 8 | 410 | PCP TM 0300 | MDI/trimethylolpropane diacrylate |
| 8 | VIII | 2 | 940 | Polymeg TM 650[h] | 2-isocyanatoethyl methacrylate |
| 9 | IX | 18 | 100 | pentaerythritol | TDI/pentaerythritol triacylate |
| 10 | X | 18 | 200 | Jeffamine TM D-400[i] | TDI/pentaerythritol triacylate |

[a]the polyol from which the sulfoesterpolyol was prepared by reaction of two moles of the listed polyol and one mole of dimethyl 5-sulfoisophthalate
[b]polycaprolactonediol having a molecular weight of 830 available from Union Carbide Corp.
[c]toluene diisocyanate, one mole of which was reacted with one mole of pentaerythritol triacrylate to form the isocyanatoalkyl acrylate
[d]poly(oxyethylene)diol having a molecular weight of 600 available from Union Carbide Corp.
[e]poly(oxytetramethylene)diol having a molecular weight of 1000 available from Quaker Oats Co.
[f]polycaprolactonetriol having a molecular weight of 540 available from Union Carbide Corp.
[g]bis(4-isocyanatophenyl)methane
[h]poly(oxytetramethylene)diol having a molecular weight of 650 available from Quaker Oats Co.
[i]polyoxypropylene triamine having a molecular weight of about 400

EXAMPLE 10

Coating compositions of each Carbamate Acrylate II-IX were prepared in accordance with the procedure of EXAMPLE 1. To each composition was added 0.1 g of Methyl Violet 2 B Base and the composition was coated onto 75 m sheets of biaxially stretched poly(ethylene terephthalate) and dried in the air to provide a coating 5 micrometers thick. Each coating was exposed through a mask to ultraviolet light from a 20 watt black light at a distance of 8.9 cm (3.5 inches) for 5 minutes. The unexposed areas of the coating were readily removed by washing with water or aqueous methanol leaving a deep blue colored, tough abrasion-resistant coating of insoluble polymer in the exposed areas.

EXAMPLE 11

A coating composition was prepared as described in EXAMPLE 1 and TABLE I from 20 g Carbamate Acrylate II, 2.0 g poly(vinyl pyrrolidone) available from GAF Corp., and 0.05 g Methyl violet 2B Base (as image indiator) in 80 ml of 20 percent methyl ethyl ketone in water. 0.4 g of 2,4-bis(trichloromethyl)-6-(4-methoxystyryl)-s-triazine (as disclosed in U.S. Pat. No. 3,954,475) was used as a photoinitiator. This composition was coated on grained anodized aluminum using a squeeze roll coater and then dried. A coating weight of about 1.7 g per square meter was obtained. The coating was exposed in a vacuum frame to a carbon arc for 40 seconds through a neutral density filter and a negative. It was developed by wiping with aqueous methanol.

EXAMPLE 12

Using the procedure described in Example 1, two moles of polyoxyethylenediol having a molecular weight of 1000 and one mole of dimethyl sodiosulfoisophthalate were caused to react and the sulfopolyoxyethylenediol obtained converted into the isocyanate-terminated sulfocompound by reaction with 1000 g (seven isocyanate equivalents) of Isonate® 143L in accordance with the procedure also described in Example 1. The products obtained was an isocyanated-terminated sulfocompound having an isocyanate equivalent weight of about 450.

The isocyanate-terminated sulfocompound was converted to the ethylenically-unsaturated sulfocompound by heating 45 grams with 37.1 grams of pentaerythitol triacrylate in accordance with the procedure described in Example 1. The polymer obtained was readily soluble in common solvents from which it could be coated as a film that dried to a non-tacky coating that could be redissolved in common solvents.

A cleaned copper sheet was coated with a benzoin ethyl ether-sensitized solution of the above described ethylenically-unsaturated sulfocompound, dried, exposed and developed as described in Example 1. The exposed areas were undamaged when the copper sheet was immersed in a Woods metal bath at 260° C. for 30 seconds and withstood a 30 percent ferric chloride copper etching bath without undercutting.

The above described isocyanate-terminated sulfocompound was moisture cured on a Teflon ® coated spin caster using the moisture in the ambient air (about 50% relative humidity). A rubbery tack-free film about 40 micrometers in thickness was obtained. The film had a tensile strength at break of 17.5 megapascals (MPa) and an elongation of 350% at 50% RH and a glass transition temperature ($T_g$) of $-6°$ C. The film was hydrophilic and gained 75% in weight when placed in water. On drying, the film returned to its original characteristics.

EXAMPLE 13

The procedure of Example 12 was repeated using four moles instead of two moles of polyoxyethylenediol 1000 and 15 instead of 7 isocyanate equivalents of Isonate ® 143L. Similar thermal and undercutting results were obtained for cured coats of the cured isocyanate-terminated sulfocompound on copper sheeting as was obtained for the coating in Example 12.

When cured on the spin caster as described in Example 12, a rubbery tack-free film was obtained having a tensile strength at break of 10.9 MPa and an elongation of 250% at 50% RH and a glass transition temperature of $-6°$ C.

Various modifications and alterations of this invention will become apparent to those skilled in the art without departing from the scope and spirit of this invention, and it should be understood that this invention is not to be unduly limited to the illustrative embodiments set forth herein.

I claim:

1. A symmetric isocyanate-terminated sulfocompound having a single central sulfo group consisting essentially of the reaction product of polyisocyanate and sulfopolyol or sulfopolyamine which is the reaction product of one mole of a sulfodicarboxylic acid and two moles of an aliphatic polyol or polyamine having two or more hydroxyl or amino groups attached to a linear chain and having a molecular weight of up to 2000.

2. The isocyanate-terminated sulfopolyester or sulfopolyamide of claim 1 having the formula

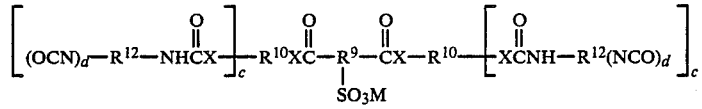

wherein

R is hydrogen or methyl;

R⁹ is an arenetriyl (trivalent arene) group having 6 to 12 carbon atoms or an alkanetriyl (trivalent alkane) group having 2 to 12 carbon atoms remaining after the removal of carboxyl and sulfo groups from sulfoarene- and sulfoalkane dicarboxylic acids having the formula

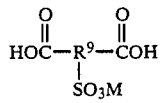

in which M is a cation, or a primary, secondary, tertiary, or quaternary ammonium cation, and benzyltrimethylammonium cation;

R¹⁰ is a linear aliphatic group having a valence of (c+1) consisting of a saturated chain of up to about 110 carbon atoms in units of 2 to 12 —CH₂— groups which can be separated by individual oxygen atoms

groups, the aliphatic group having a molecular weight of up to about 2000, wherein c is an integer of 1, 2, or 3;

R¹² is an organic group having a valence of (d+1) selected from linear and branched groups having 2 to 12 carbon atoms, 5- and 6-membered carbocyclic groups having 5 to 14 carbon atoms wherein d is an integer having a value of 1 to 3; and X is —O— or —NH—.

3. Thee isocyanate-terminated sulfocompound of claim 2 wherein R¹⁰ is derived from an aliphatic polyesterpolyol or a polyetherpolyol.

4. The isocyanate-terminated sulfocompound of claim 3 whrein R¹⁰ is derived from a polycaprolactonediol.

5. The isocyanate-terminated sulfocompound of claim 2 wherein M is H, an alkali or alkaline earth metal ion, or a primary, secondary, tertiary, or quaternary ammonium cation.

6. The isocyanate-terminated sulfocompound of claim 3 wherein the aliphatic polyetherpolyol is polyoxyethylenediol having a molecular weight of 1000.

7. The isocyanate-terminated sulfocompound according to claim 1 wherein up to four moles of polyisocyanate are used per mole of sulfopolyol or sulfopolyamine.

* * * * *

UNITED STATES PATENT AND TRADEMARK OFFICE
CERTIFICATE OF CORRECTION

PATENT NO. : 4,746,717

DATED : May 24, 1988

INVENTOR(S) : Wayne K. Larson

It is certified that error appears in the above-identified patent and that said Letters Patent is hereby corrected as shown below:

Col. 6, line 1, delete "1.0" and insert therefor -- 1. --.

Col. 12, line 37, delete "boxyethyl]fluorene-2-sulfonic" and insert therefor -- boxyethyl)fluorene-2-sulfonic --.

Col. 20, line 32, delete "Thee" and insert therefor -- The --.

Signed and Sealed this

Twenty-third Day of May, 1989

Attest:

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,746,717

DATED : May 24, 1988

INVENTOR(S) : Wayne K. Larson

It is certified that error appears in the above-identified patent and that said Letters Patent is hereby corrected as shown below:

Col. 19, line 53, delete entire line stating "R is hydrogen or methyl;".

Signed and Sealed this

Fifth Day of December, 1989

Attest:

JEFFREY M. SAMUELS

Attesting Officer — Acting Commissioner of Patents and Trademarks